United States Patent [19]
Wilson et al.

[11] Patent Number: 5,212,623
[45] Date of Patent: May 18, 1993

[54] PORTABLE POWER DISTRIBUTION CABINET

[75] Inventors: Charles P. Wilson, Richmond; William G. Bowers, Colonial Heights, both of Va.

[73] Assignee: Chewning & Wilmer, Inc., Richmond, Va.

[21] Appl. No.: 816,237

[22] Filed: Jan. 3, 1992

[51] Int. Cl.$^5$ .............................................. H02B 1/26
[52] U.S. Cl. ...................... 361/334; 174/38; 361/357
[58] Field of Search ................ 307/150; 361/332–335, 361/356, 357, 376; 439/92, 638, 639; 174/38

[56] References Cited

U.S. PATENT DOCUMENTS

| | | | |
|---|---|---|---|
| 1,884,000 | 10/1932 | Lewis | 361/356 |
| 2,625,591 | 1/1953 | George | 361/332 |
| 2,988,655 | 6/1961 | Rudolph et al. | 361/334 |
| 3,631,324 | 12/1971 | Jones | 361/357 |
| 4,318,156 | 3/1982 | Gallagher | 361/358 |
| 4,390,926 | 6/1983 | Hart | 361/334 |
| 4,426,674 | 1/1984 | Holte | 361/334 |
| 5,035,630 | 7/1991 | Norsworthy | 361/334 |

Primary Examiner—Gregory D. Thompson
Attorney, Agent, or Firm—Mason, Fenwick & Lawrence

[57] ABSTRACT

A box member is provided for containing electrical distribution circuits, including circuit breakers, and which has a front wall, a back wall, side walls and end walls, with an electrical inlet receptacle located on one end wall of the box. A receptacle support member extends rearwardly from the box back wall and has a rear surface, side surfaces and end surfaces. The side-to-side width of the support member is substantially smaller than the side-to-side width of the box member, and the support member is preferably centered with respect to the side walls of the box member so as to form a "T" shape configuration. At least one electrical outlet receptacle is also located on each side surface of the support member, and each outlet receptacle extends outwardly and downwardly from its support side surface but does not protrude beyond a side wall of the box member. The distance between the front wall of the box member and the rear surface of the support member is approximately equal to the side-to-side width of the box member.

19 Claims, 2 Drawing Sheets

PORTABLE POWER DISTRIBUTION CABINET

FIELD OF THE INVENTION

The present invention relates to a portable power distribution cabinet for containing circuits which can temporarily supply electricity to a number of output loads. In particular, the invention provides a compact circuit housing of novel design that is particularly useful in confined spaces at construction sites or other workplaces, such as aboard ships, where permanent power facilities are unavailable or out of service.

BACKGROUND AND SUMMARY OF THE INVENTION

During building or repair tasks at construction sites or other workplaces, it is often necessary to provide temporary electrical power for operating a number of lights, tools or other devices at the same time when permanent power distribution facilities have not yet beer installed or are out of service because of damage or equipment failure. In some cases the temporary power distribution apparatus must be carried through or used in a confined space that does not afford much room for the apparatus. This is especially true in shipyards where electrical power is needed on board vessels that are being constructed or repaired. In this particular environment, access to a ship's interior compartments or hold may be by relatively small hatchways that limit the physical size or shape of power distribution equipment to be passed therethrough, especially when projecting power receptacles must be provided on such equipment because of user requirements. Also, the compartments or the work in progress therein could be of a size or nature which does not leave sufficient deck or floor space on which to lay the equipment when in use.

The subject invention solves the aforementioned problems by providing a portable and compact T-shaped cabinet that can house electrical power distribution components, including circuit breakers, for a number of protruding outlet receptacles which supply electricity to various external loads. This cabinet can be easily hoisted or lowered through small openings, such as round hatchways, and it also can be suspended from overhead structure if necessary when floor space is limited. While portable power distribution cabinets are known in the prior art (e.g., see U.S. Pat. No. 3,631,324 (Jones), U.S. Pat. No. 4,318,156 (Gallagher), and U.S. Pat. No. 4,390,926 (Hart)), they do not include the specific structure of the novel device described and claimed herein, which is particularly, although not exclusively, adapted for use on ships.

Accordingly, it is a primary object of the present invention to provide a portable power distribution cabinet having a novel configuration which permits its passage through relatively small openings.

Another primary object of the present invention is to provide a portable power distribution cabinet that allows a number of projecting outlet receptacles to be located thereon so as not to increase its cross-sectional dimensions.

A further object of the present invention is to provide a portable power distribution cabinet which can be suspended while in use without impairing accessibility to the outlet receptacles thereon or causing undesirable kinks in output power cables connected to these receptacles.

These and other objects of the present invention are generally achieved by providing a box member means for containing electrical distribution circuits and having a front wall, a back wall, side walls and end walls, with an electrical inlet receptacle located on one end wall of the box, together with a receptacle support member extending rearwardly from the box back wall and having a rear surface, side surfaces and end surfaces. The side-to-side width of the support member is substantially smaller than the side-to-side width of the box member, and the support member is preferably centered with respect to the side walls of the box member so as to form a "T" shape configuration. At least one electrical outlet receptacle is also located on each side surface of the support member, and each outlet receptacle extends outwardly and downwardly from its support side surface but does not protrude beyond a side wall of the box member. Moreover, the distance between the front wall of the box member and the rear surface of the support member is approximately equal to the side-to-side width of the box member.

DETAILED DESCRIPTION OF THE PREFERRED EMBODIMENT

Figure 2:
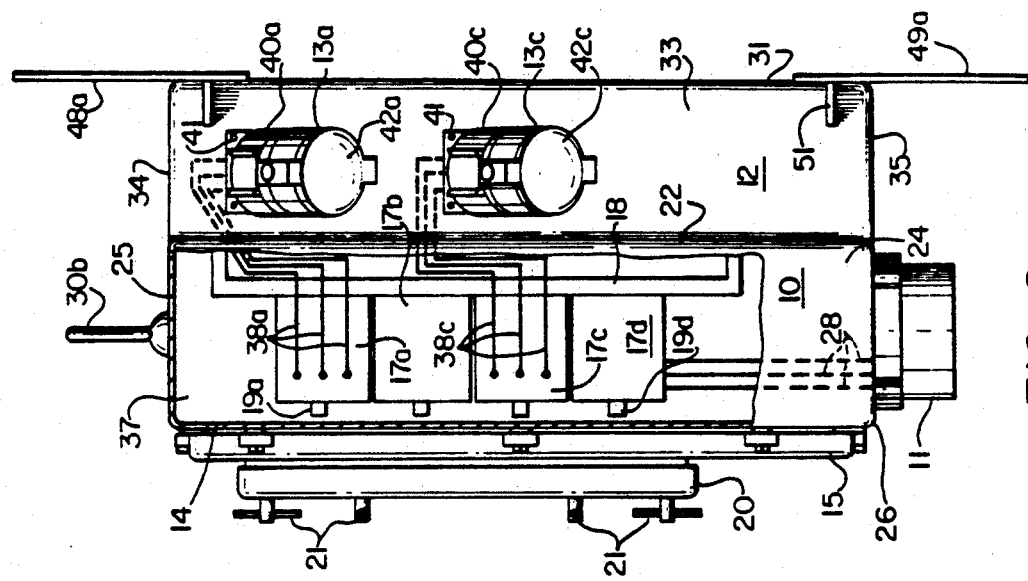
FIG. 2 is a side elevation, partial sectional view of the cabinet.

In describing the subject invention illustrated in the drawings, specific terminology is used for the sake of clarity. However, the invention is not intended to be limited to the specific terms so selected, and each specific term includes all technically equivalent terms for components operating in a similar manner to accomplish a similar purpose.

FIGS. 1 through 5 are various external and partial section views of one preferred embodiment of the novel power distribution cabinet which comprises the subject invention. This cabinet, which can be made of sheet metal, consists of two major units, namely, a front box member 10 for housing electrical circuits that are fed from a power inlet receptacle 11, and a rearwardly extending support member 12 on which are located several projecting electrical power outlet receptacles 13a through 13d. When viewed from the cabinet top end (FIG. 4) or the cabinet bottom end (FIG. 5), these two members 10 and 12 together have a cross-sectional profile in the shape of a "T" which provides a balanced configuration and conserves space when the cabinet is used in or moved through tight quarters.

Figure 1:
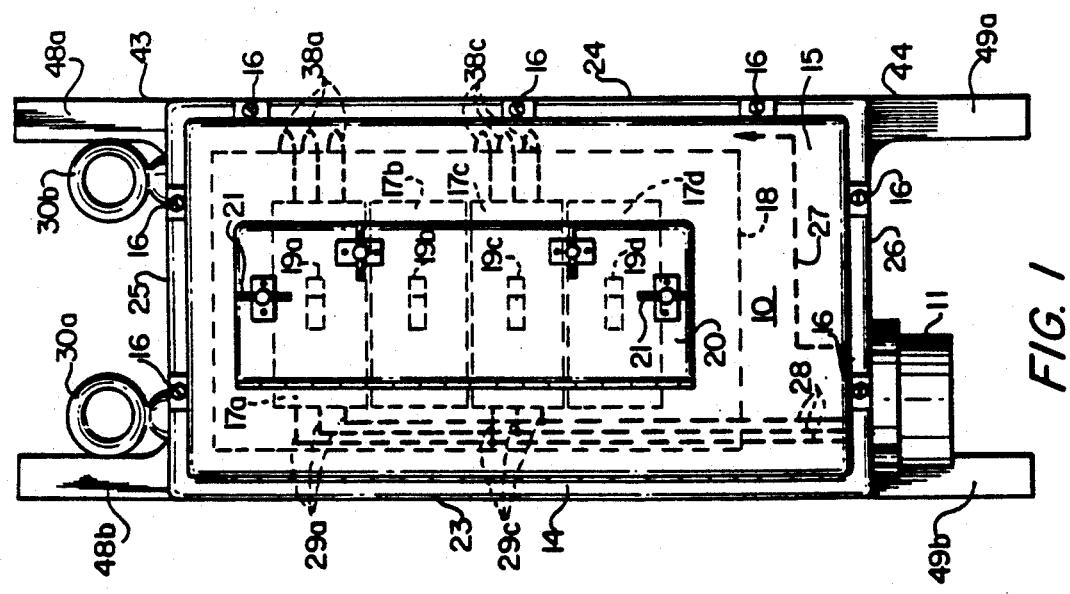
FIG. 1 is a front elevation view of the cabinet according to the present invention.

As best shown in FIGS. 1 and 2, box member 10 has a front wall 14 which includes a main convex cover or door 15 that is hinged or otherwise removably attached to wall 14 over a large opening therein. Door 15 provides access to the hollow interior 37 of box 10 for inserting power distribution circuits within said interior. Screw fasteners 16 around the perimeter of wall 14 engage the top, bottom and right edges of door 15 to keep it closed during the normal use of the cabinet and its enclosed circuits. As is further shown in FIGS. 1 and 2, the internal electrical circuits may include one or more circuit breakers 17a through 17d mounted on a raised panel 18 and having slidable manual switch handles 19a through 19d for operating these breakers. A smaller hinged cover door 20 may also be provided over an opening in main door 15 for providing easy access to these switch handles 19 when rotatable grip latches 21 are turned to release the unhinged edges of door 20.

Box 10 further includes a back wall 22, respective left and right vertical side walls 23 and 24, and respective top and bottom end walls 25 and 26. The top end wall 25 of box 10 may also be provided with two eye bolts 30a and 30b by which the cabinet can be hoisted or tied to overhead structure during its temporary use at a work place. The power inlet receptacle 11 is preferably located or the outside of box bottom end wall 26 for connection to an external power source that feeds the electrical distribution circuits within box 10. For example, inlet receptacle 11 may receive electrical power from a three-phase source. Inside box 1C, the current in each phase is applied to a respective one of three input terminals on each of the four circuit breakers 17a through 17d which are connected in parallel. These connections in FIG. 1 are represented by the three-wire input bus 28 and the three-wire conductors 29a and 29c which are three-phase inputs from inlet 11 to circuit breakers 17a and 17c. While not shown in FIG. 1 for the sake of drawing simplicity, circuit breakers 17b and 17d also have similar three-phase inputs thereto from bus 28 of inlet receptacle 11. In addition, a common ground connection 27 may also enter the cabinet via inlet 11 and be directly routed (not shown) to each outlet receptacle 13a through 13d. Of course, single phase circuits can also be accommodated by the novel cabinet of the present invention.

The outlet receptacle support member 12 rearwardly extends from the back wall 22 of box member 10 and includes a rear surface 31, respective left and right vertical side surfaces 32 and 33, and respective top and bottom end surfaces 34 and 35. The box 10 and support 12 may be discrete units attached to each other by various well known means, or they may be formed as one integral unit in the manner shown by FIGS. 4 and 5. The interior 36 of support 12 is hollow and physically communicates with the hollow interior 37 of box 10 so that wires 38a and 38c can be strung therethrough for connecting the circuits in box 10 with the outlet receptacles 13 on support 12. This preferably is done by making support 12 in the form of a hollow channel whose open front side abuts an opening of similar size in the back wall 22 of box 10.

Figure 4:
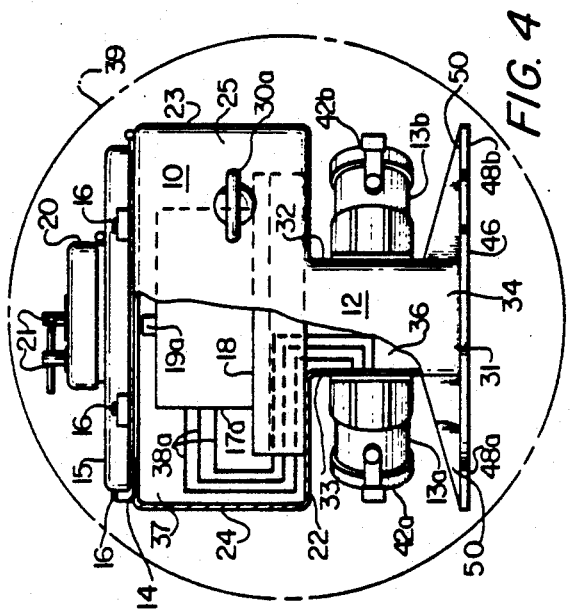
FIG. 4 is a top partial sectional view of the cabinet.
Figure 5:
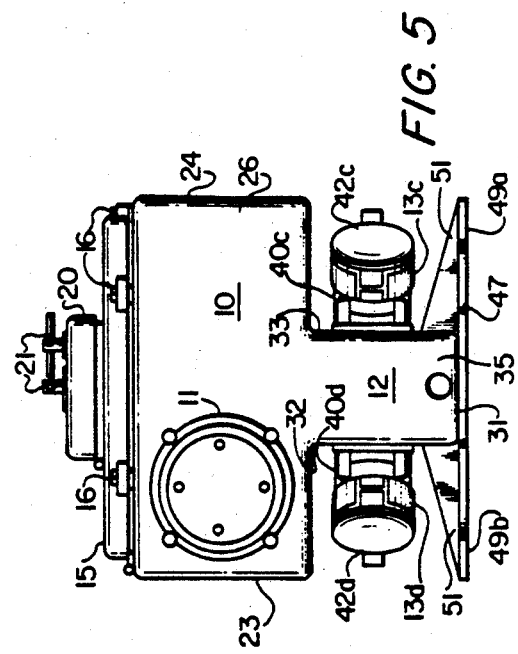
FIG. 5 is a bottom view of the cabinet.

In the preferred embodiment, the top-to-bottom height of support 12 is about the same as the height of box 10 between its top and bottom end walls 25 and 26. However, the side-to-side width of support 12 between walls 32 and 33 is substantially less than the side-to-side width of box 10 between walls 23 and 24. Support 12 also is preferably centered between the box side walls 23 and 24 so that these two members 10 and 12 have a top and bottom view profile in the shape of a "T" which is best shown in FIGS. 4 and 5. This symmetrical "T" shape permits the cabinet's weight to be at least approximately balanced around a longitudinal or vertical center axis thereof so as to make easier a task of hand-carrying the cabinet should this be needed. The rearward extension of support 12 also preferably is such that the distance between the box front wall 14, including doors 15 and 20, and the support rear surface 31 is approximately the same (e.g., ±15%) as the side wall-to-side wall width of box 10 This generally square relationship will permit the entire cabinet to be hoisted or lowered endwise through a small opening, such as a typical 24" circular shipboard hatchway, at any angular orientation around its longitudinal center axis. The dot-dash circle 39 surrounding the cabinet in FIG. 4 illustrates this desirable attribute of the cabinet's shape to fit in or be moved through relatively small spaces.

Protruding power outlet receptacles 13a through 13d are also located on the side surfaces 32 and 33 of support member 12. Such projecting receptacles, rather than flush-mounted or flat receptacles, are often required by a user because they can incorporate features such as arc suppression and easy disconnect structure. These protruding receptacles 13 13athrough 13d do not impair the endwise passage of the cabinet through small openings, as illustrated in FIG. 4, because they are located on the side surfaces of the narrow support member 12 which thus allows room for the outlets to project behind and parallel to the wider back wall 22 of box 10. However, the outer ends of receptacles 13a through 31dshould not project beyond the box side walls 23 and 24.

Figure 3:
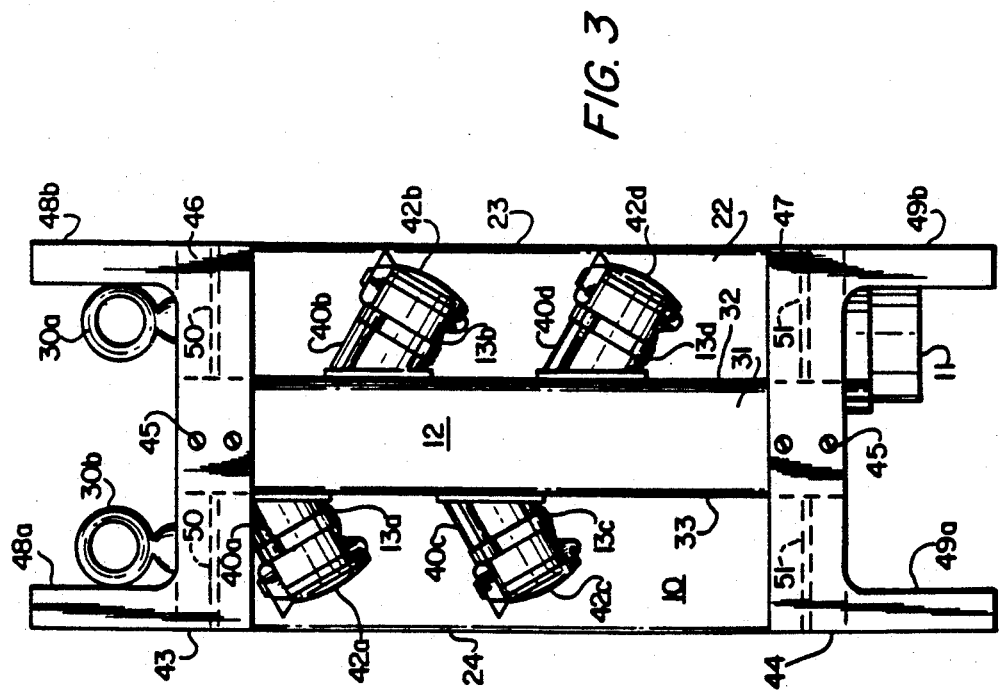
FIG. 3 is a rear elevation view of the cabinet.

As best shown in the FIG. 3 rear view, these receptacles 13a through 13d in the preferred embodiment are also respectively attached to angle adapters 40a through 40d that extend outwardly and downwardly from the support side surfaces 32 and 33 to which they are secured by screws 41 or other fastening means. This downward inclination of receptacles 13a through 13d allows them to be easily accessed when the cabinet is suspended above the floor. Moreover, any external cables or extension cords which are plugged into these inclined outlets will not have sharp bends or undesirable kinks therein that could eventually result in cable failure or maintenance problems.

The number of outlet receptacles 13a through 13d depends on the number of external power circuits or loads to be supplied with electricity via these receptacles from the distribution circuits contained in box 10. Each outlet receptacle 1313a through 13d may include a respective hinged protecting cover 42a through 42d and is connected by wires through the interior 36 of support 12 with the internal circuits in box 10. For example, receptacles 13a and 13c are respectively connected by the three-phase wires 38a and 38c to the three-phase output terminals of circuit breakers 17a and 17c shown in FIGS. 1 and 2. These connecting output wires 38a and 38c from circuit breakers 17a and 17c are looped over and then under the open side of raised panel 18, as best shown in FIG. 4, before entering the hollow interior 36 of support 12 where they are respectively attached to the outlet receptacles 13a and 13c. Although not shown in the drawings for the sake of simplicity, additional three-phase output wires 38 are also similarly connected from circuit breakers 17b and 17d to the other outlet receptacles 13b and 13d, respectively. The two receptacles 13a and 13c on support side surface 33 are preferably also offset with respect to the two receptacles 13b and 13d on the opposite side surface 32. This is for the purpose of reducing the congestion of wires 38 within support 12.

The preferred embodiment of the present invention, as best shown in FIG. 3, also includes two, outwardly facing C-shaped plate members 43 and 44, each respectively attached at the top and bottom of support member 12 to the rear surface 31 thereof by screws 45 or other fastening means. These plate members 43 and 44 act as feet for the cabinet when it is horizontally resting on a surface or vertically leaning upright against a wall, and they also serve to protect the receptacles 11 and 13 from damage. The respective stems 46 and 47 of plate members 43 and 44 transversely extend beyond the support side surfaces 32 and 33 and, preferably, are not longer the side-to-side width of box 10 so as not to impede the passage of the cabinet through small openings. The respective legs 48a, 48b and 49a, 49b of plates 43 and 44 extend outwardly at right angles from their stems to provide additional horizontal supporting area for the cabinet feet. The ends of these legs also provide resting points for the cabinet when it is vertically upright on a floor. Each C-shaped plate further includes a thin, front-facing reinforcing rib 50 or 51 which runs lengthwise of its stem and abuts both side surfaces of support 12.

In summary, the present invention provides a portable power distribution cabinet in a novel shape to permit easy handling and a minimum need for space. Moreover, additional outlet receptacles, as needed, may be vertically added to a longer support member 12 without increasing the cabinet's cross-sectional "T" shape dimensions or, otherwise, affecting the ability to pass the cabinet endwise through a small opening.

Many modifications and variations of the present invention are possible considering the above teachings and specifications. Therefore, within the scope of the appended claims, the invention may be practiced otherwise than as specifically described above.

What is claimed is:

1. A portable electric power distribution cabinet which comprises:
   (a) box means for containing electrical circuits and including a front wall;
   (b) receptacle support means extending rearwardly from said box means, where the dimension of said support means in at least one direction generally parallel to said box front wall is substantially smaller than the dimension of said box means in the same direction;
   (c) an electrical inlet receptacle located on said box means; and
   (d) at least one electrical outlet receptacle located on said support means and oriented to face in a direction that is substantially parallel to the box front wall.

2. A portable electric power distribution cabinet which comprises:
   (a) box means for containing electrical circuits and having a front wall, a back wall, side walls and end walls;
   (b) an electrical inlet receptacle located on one end wall of said box means;
   (c) receptacle support means extending rearwardly from said box back wall and having a rear surface, side surfaces and end surfaces, wherein the side-to-side width of said support means is substantially smaller than the side-to-side width of said box means; and
   (d) at least one electrical outlet receptacle located on one of said side surfaces of said support means.

3. The cabinet according to claim 2, wherein said outlet receptacle extends outwardly and downwardly from said one side surface of the receptacle support means.

4. The cabinet according to claim 3, wherein (a) the distance between the front wall of said box means and the rear surface of said support means is approximately equal to (b) the distance between the side walls of the box means.

5. The cabinet according to claim 4, wherein said outlet receptacle extends outwardly from said support side surface.

6. The cabinet according to claim 2, wherein said support means is centered with respect to the side walls of said box means.

7. The cabinet according to claim 2, wherein said box front wall further includes an opening which is covered by a removable door thereon.

8. A portable electric power distribution cabinet which comprises:
   (a) hollow box means for containing electrical circuits and having a front wall, a back wall, vertical side walls, and top and bottom end walls;
   (b) an electrical inlet receptacle located on said bottom end wall of said box means;
   (c) hollow receptacle support means extending rearwardly from said box back wall around an opening in said box back wall, the hollow receptacle support means having a rear surface, first and second side surfaces, and top and bottom end surfaces, wherein the side-to-side width of said support means is substantially smaller than the side-to-side width of said box means and said support means is centered with respect to the side walls of said box means; and
   (d) at least one electrical outlet receptacle located one each side surface of said support means.

9. The cabinet according to claim 8, wherein each said outlet receptacle extends outwardly and downwardly from the said support side surface on which it is located.

10. The cabinet according to claim 9, wherein none of said outlet receptacles protrude beyond imaginary planes including respective side walls of said box means.

11. The cabinet according to claim 8, wherein the distance between the front wall of said box means and the rear surface of said support means is approximately equal to the side-to-side width of said box means.

12. The cabinet according to claim 11, wherein each said outlet receptacle extends outwardly and downwardly from the said support side surface on which it is located.

13. The cabinet according to claim 8, wherein said box front wall further includes a first opening which is covered by a first removable door thereon.

14. The cabinet according to claim 13, wherein said first door includes a second opening which is covered by a second removable door thereon.

15. The cabinet according to claim 8, which further includes two plate members respectively attached to the top and bottom of said rear surface of said support means.

16. The cabinet according to claim 15, wherein each said plate member is C-shaped.

17. The cabinet according to claim 8, which further includes means attached to said box top end wall for suspending said cabinet.

18. The cabinet according to claim 8, wherein:
   at least one first-side electrical outlet receptacles is mounted on said first support side surface; and
   at least one second-side electrical outlet receptacles is mounted on said second side surface; and
   each said first-side outlet receptacle is vertically offset with respect to each second-side outlet receptacle.

19. The cabinet according to claim 8, wherein:
said box means contains a separate circuit breaker for each said outlet receptacle, each circuit breaker having input terminals and output terminals;

the input terminals of each said circuit breaker are connected to said inlet receptacle; and
the output terminals of each said circuit breaker are connected to a different said outlet receptacle.

* * * * *